United States Patent [19]

Petoia

[11] Patent Number: 4,551,059

[45] Date of Patent: Nov. 5, 1985

[54] MULTI-DIRECTIONAL STRADDLE-LIFT CARRIER

[75] Inventor: Salvatore R. Petoia, Brick Town, N.J.

[73] Assignee: The United States of America as represented by the Secretary of the Navy, Washington, D.C.

[21] Appl. No.: 548,047

[22] Filed: Nov. 2, 1983

[51] Int. Cl.⁴ ................................................ B60P 1/00

[52] U.S. Cl. .................................... 414/459; 414/909

[58] Field of Search ........................ 414/458, 459, 909

[56] References Cited

U.S. PATENT DOCUMENTS

| | | | |
|---|---|---|---|
| 1,587,083 | 6/1926 | Neuzerling | 414/909 X |
| 2,316,938 | 4/1943 | Dimick | 414/459 |
| 3,031,024 | 4/1962 | Ulinski | 180/6.5 |
| 3,040,827 | 6/1962 | Ulinski | 180/6.5 |
| 3,161,309 | 12/1964 | Baudhuin et al. | 414/459 |
| 3,348,711 | 10/1967 | Gove | 414/459 |
| 3,481,417 | 12/1969 | Jarret et al. | 180/6.5 |
| 3,874,468 | 4/1975 | Chatterjea | 180/6.48 |
| 3,893,530 | 7/1975 | Gordon | 180/6.5 |
| 3,933,218 | 1/1976 | Oler et al. | 414/458 X |
| 3,967,743 | 7/1976 | Yoder | 414/458 |
| 4,204,790 | 5/1980 | Baxter | 414/459 X |
| 4,213,726 | 7/1080 | Robnett et al. | 414/458 X |

FOREIGN PATENT DOCUMENTS

| | | | |
|---|---|---|---|
| 981635 | 1/1976 | Canada | 414/458 |

*Primary Examiner*—Robert J. Spar

*Assistant Examiner*—Ken Muncy

*Attorney, Agent, or Firm*—Robert F. Beers; Henry Hansen; Vincent T. Pace

[57] ABSTRACT

A straddle-lift carrier for transporting long heavy loads, having adjustable width for accommodating various size loads and for compacting the carrier for storage. The adjustable width allows the carrier to negotiate relatively narrow passages. A high degree of maneuverabiltity is achieved by utilization of independently driven and steered traction wheels. Raising and lowering of loads is accomplished by hydraulically operated forklift mechanisms disposed on either side of the carrier. Operation of the carrier is controlled by a handheld remote control unit.

3 Claims, 18 Drawing Figures

MULTI-DIRECTIONAL STRADDLE-LIFT CARRIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to carriers for transporting bulky loads in confined areas, and in particular to a multi-directional, self-propelled, straddle-lift carrier capable of negotiating relatively narrow passageways while transporting a long, heavy load.

Industrial trucks are often required to move about in narrow aisles in warehouses and factories. They must, therefore, be very maneuverable in order to handle loads in the manner required. Conventional forklift trucks are generally impractical for this type of operation because of their rather limited maneuverability. Furthermore, even forklift trucks which are more maneuverable, such as that disclosed in U.S. Pat. No. 3,031,024 to Ulinski, are still unsuitable because the load is ordinarily oriented perpendicular to the direction of travel. This problem becomes more acute with longer loads.

Similarly, naval combat vessels generally have relatively narrow interior passageways. One of the current techniques for transporting long weapons aboard such vessels is to utilize manually operated hand-lift trucks. Often two such hand-trucks are employed: one at each end of the weapon container.

Currently, the combined load capacity of a pair of these hand-trucks is about 5,000 pounds. However, the weight of weapons is escalating, and some weapons, such as the TOMAHAWK missile, may weigh up to 7,000 pounds. Manual effort to lift and move such loads is becoming unrealistic.

Powered versions of the end-lifting trucks in some cases have proven impractical because they increase the overall length of the transporter/load combination beyond tolerable limits. Furthermore, controlling coordination of two transporters in tandem could be a relatively complex and costly problem to overcome.

A straddle-lift carrier would seem to be an appropriate answer to the above described requirements. Most such carriers, however, are fairly large in size and thus are impractical for use and storage in areas having limited space. A straddle-lift carrier which could be expanded to carry relatively wide loads, but which could be collapsed for fairly compact storage would be desirable.

SUMMARY OF THE INVENTION

Accordingly, one object of this invention is to straddle and lift heavy, elongated loads.

Another object of this invention is to transport such loads.

A further object of this invention is to be capable of maneuvering in relatively narrow passageways while transporting long, heavy loads.

A still further object of this invention is to accomodate loads of various widths.

Yet another object of this invention is to be controlled by means of a single unit remote from the carrier.

Still another object of this invention is to require a minimum of self-storage space.

The above and other objects are realized in the subject invention by a rigid frame carrier having an inverted U-shaped cross section. The frame has integral telescoping apparatus for adjusting the frame width. A hydraulic pump actuates hydraulic cylinders which are linked to lifting beams having fork tines for engaging and lifting a load.

The carrier is moved by two drive wheels situated on either side of the frame. Traction is applied to these drive wheels by electric motors or some other propulsion source. The speed and direction of each wheel is independently controlled to provide for turning or rotation of the carrier. Additionally, servo-steering motors are provided for rotating the drive wheels so that oblique or lateral motion may be obtained. Caster wheels are mounted adjacent the drive wheels for balance and maneuverability.

Control of steering and driving is centered in a single, handheld, remote control unit by which the carrier can be driven or steered in any direction. A control panel is located on the carrier frame for housing the control circuits as well as switches and controls for the hydraulic lift system, batteries, etc.

Other objects, advantages, and novel features of the invention will become apparent from the detailed description of the invention which follows the accompanying drawings wherein:

DESCRIPTION OF THE PREFERRED EMBODIMENT

Figure 1:
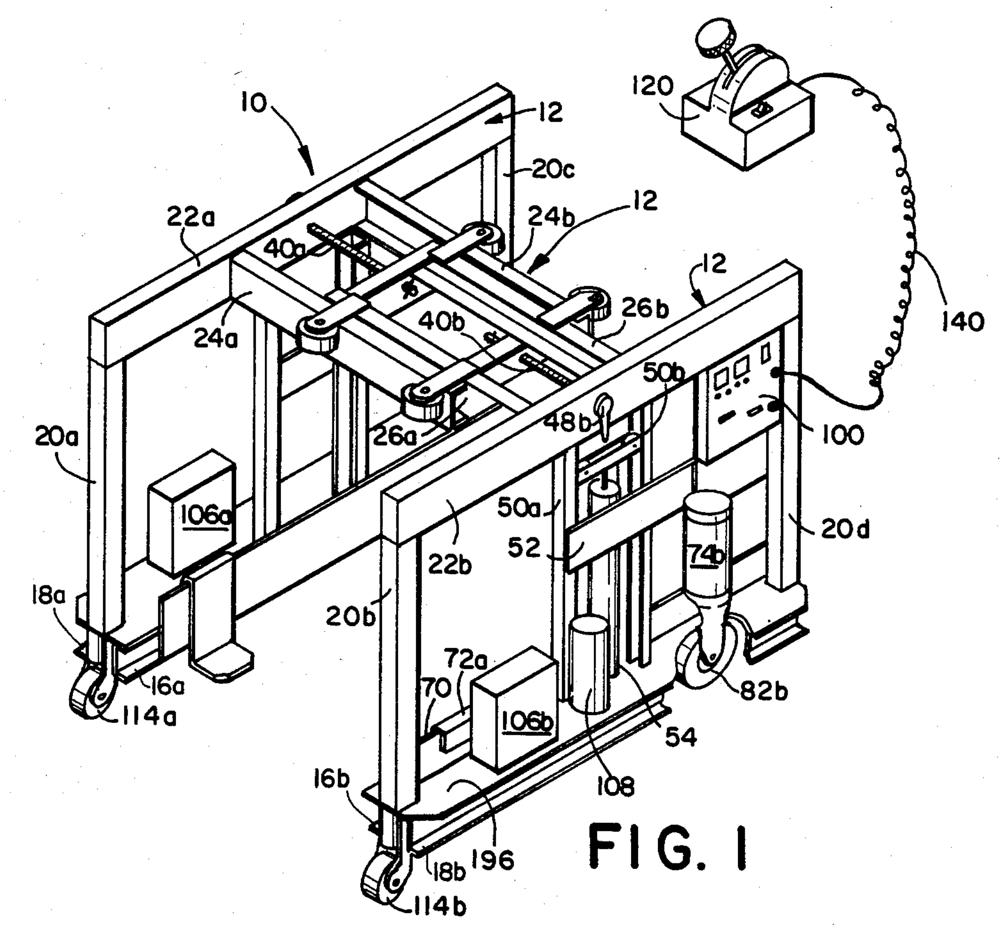
FIG. 1 shows a general view of a straddle-lift carrier according to the present invention.

Referring now to the drawings wherein like reference numerals designate identical or corresponding parts among the several views, and more particularly to FIG. 1, there is shown generally a straddle-lift carrier 10 according to the present invention.

The carrier 10 has a frame, generally designated 12. In the embodiment shown in FIG. 1, the frame 12 is constructed of steel members which form a unit having an inverted, U-shaped cross-section. The interrelation of these members is shown more clearly in FIGS. 2, 3, 4 and 5.

The sides of the frame have inner base channels 16*a* and 16*b* and outer base channels 18*a,b* as shown in FIG. 1. These channels support base plates 19*a,b*. Columns 20*a–d* are mounted vertically on the base plates 19*a,b* and support lateral beams 22*a,b*.

Figure 2:
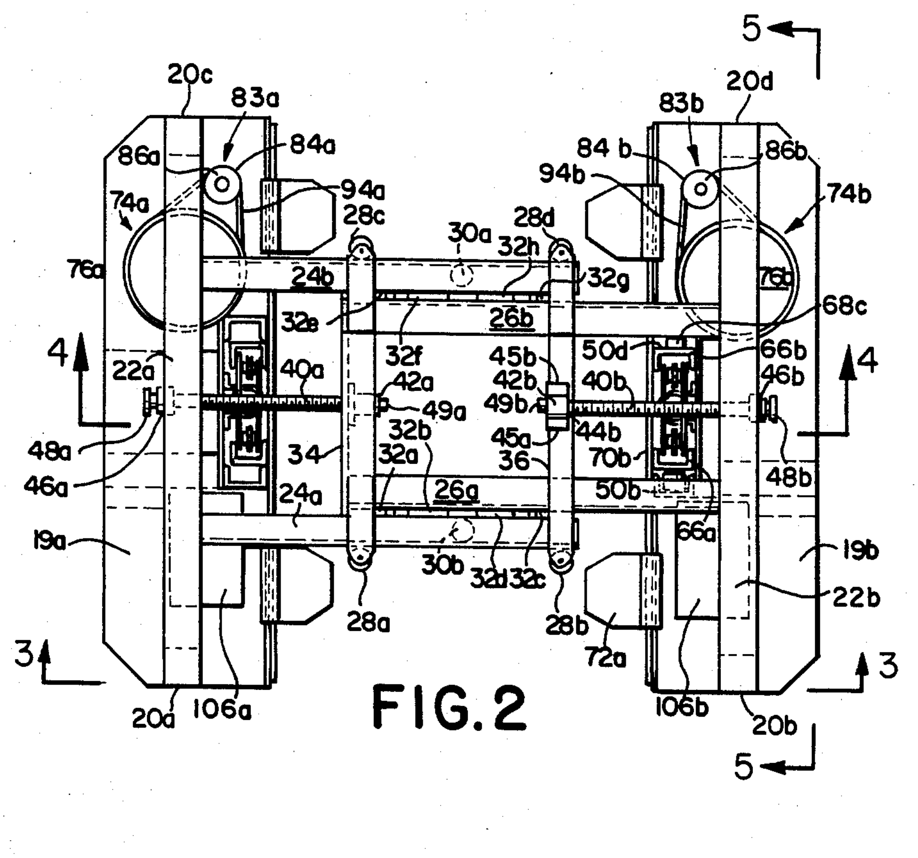
FIG. 2 is a plan view of the carrier illustrated in FIG. 1.

The connecting structure between the sides of the frame 12 includes a mechanism for adjusting the width of the carrier in order to accomodate different size loads and to make the carrier more compact for storage when not in use. As shown in FIG. 2 there are two first horizontal channel members 24*a,b* extending from the lateral beam 22*a*. Likewise, there are two second horizontal channel members 26*a,b* extending from lateral beam 22*b*. The members 26*a,b* are spaced to fit between members 24*a,b*.

Figure 3:
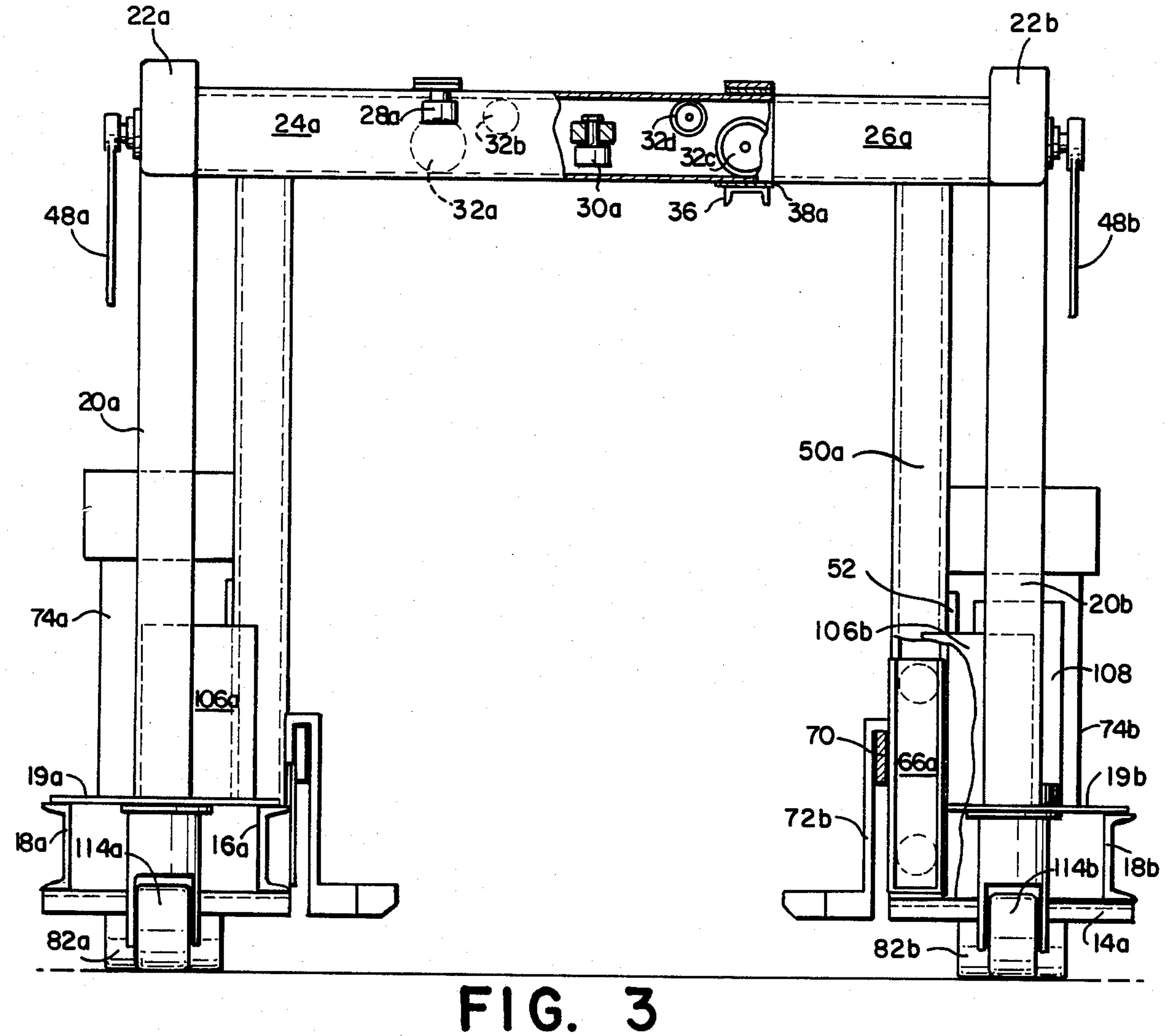
FIG. 3 shows an end of the carrier as viewed along line 3—3 of FIG. 2.

In the embodiment shown in FIGS. 2 and 3 both sets of members 24*a,b* and 26*a,b* are U-channels which are oriented with their open sides facing inwardly. External rollers 28*a–d* are attached to channel members 26*a,b* such that they will roll along the outward surfaces of channel members 24*a,b*. In addition to the external rollers 28*a–d*, there are two internal horizontal rollers 30*a,b* and eight internal vertical rollers 32*a–h*. The horizontal rollers 30*a,b* are attached to channel members 26*a,b* such that they will roll along the inner surfaces of the outward walls of channel members 24*a,b*.

The vertical rollers 32*a–h* are attached to channel members 26*a–b* such that they will roll along the inner surfaces of the upper and lower walls of channel members 24*a,b*. In this manner members 24*a,b* and 26*a,b* are connected but may slide relative to each other. Since the members 24*a,b* and 26*a,b* are rigidly connected to respective sides of the carrier frame 12, any relative motion will result in either a widening or narrowing of the space between the sides of carrier frame 12.

Figure 4:
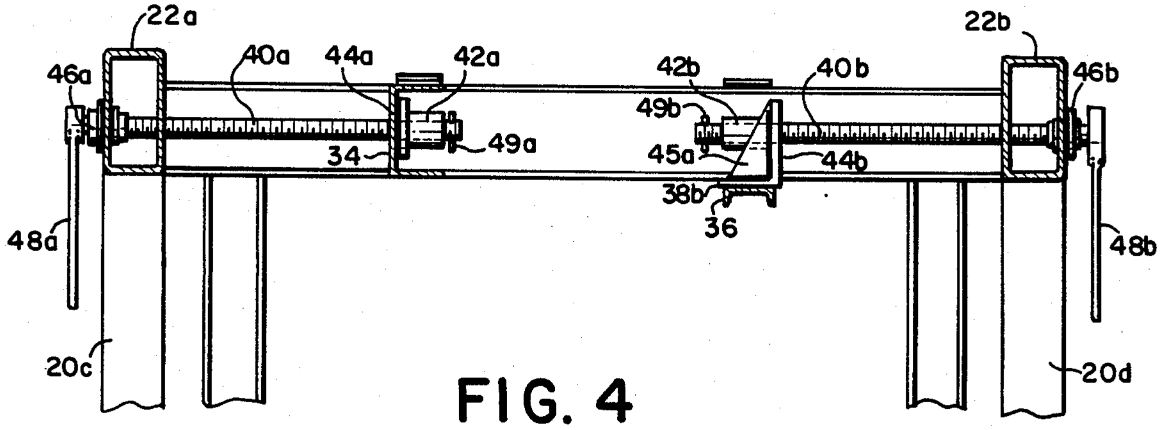
FIG. 4 shows a width adjustment mechanism for the carrier frame as viewed along line 4—4 of FIG. 2.

As shown in FIGS. 2 and 4 a first cross-member 34 is mounted between the ends of members 26*a,b* in order to provide rigidity between those members. A second cross-member 36 is mounted between the ends of members 24*a,b* by means of spacer plates 38*a,b* to provide rigidity between those members.

Adjustment of the width of the carrier 10 is accomplished by means of threaded shafts 40*a,b* which are threaded through ball bearing nuts 42*a,b*. The nuts 42*a,b* are mounted on the cross channels 34 and 36 respectively by means of nut mounting plates 44*a,b* respectively which are attached as shown in FIG. 4. Plate 44*b* is given extra rigidity by means of gusset plates 45*a,b* extending between plate 44*b* and cross-channel 36.

The threaded shafts 40*a,b* extend through the lateral beams 22*a,b* respectively in which they are supported and retained by respective support bearings 46*a,b*. Ratchet handles 48*a,b* are attached to the ends of the shafts 40*a,b* respectively for turning these shafts. Pins 49*a,b* are inserted through the other ends of shafts 40*a,b* to prevent their backing out of ball-bearing nuts 42*a,b*.

As the threaded shafts 40*a,b* are turned they will exert either pulling or pushing forces on the members 24*a,b* and 26*a,b* causing the carrier frame 12 to either expand or contract in order to accommodate different load widths. The ratchet handles 48*a,b* provide leverage for turning shafts 40*a,b* respectively and would be equipped to be turned in both clockwise and counterclockwise directions as may be desired.

Figure 5:
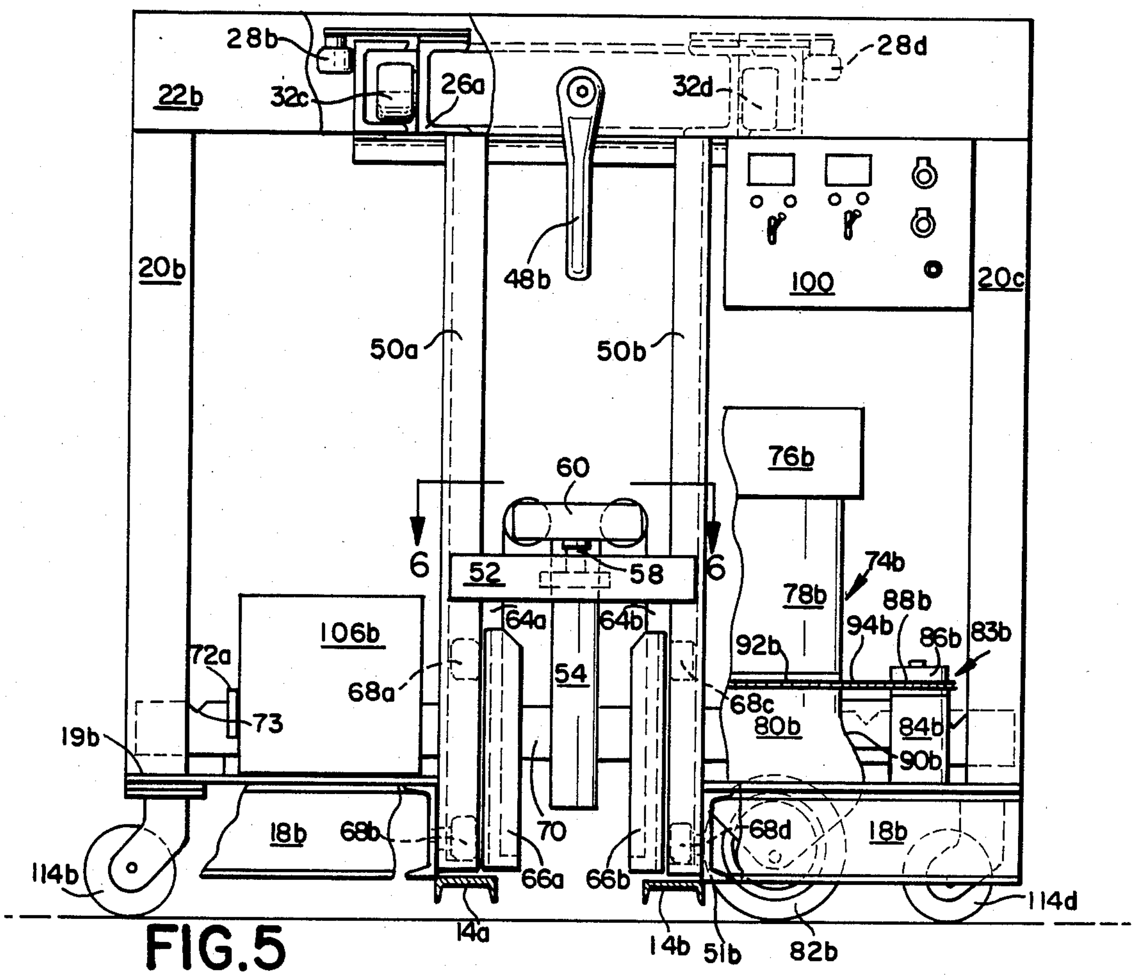
FIG. 5 shows a side of the carrier as viewed along line 5—5 of FIG. 2.
Figure 6:
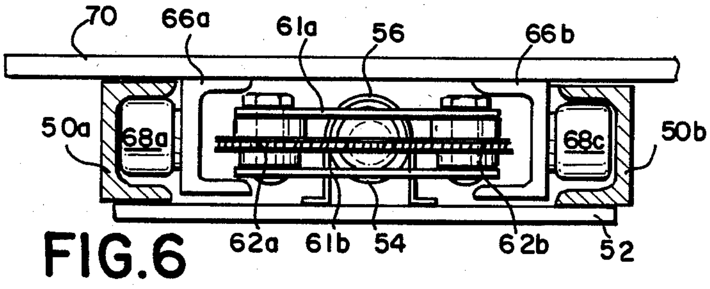
FIG. 6 shows a hydraulic lift mechanism as viewed along line 6—6 of FIG. 5.

The means for engaging and elevating a load are shown more clearly in FIGS. 5 and 6. In the embodiment shown there are two identical lift mechanisms, one on either side of the carrier. In operation these two lift mechanisms would be operated in unison. However, for ease of understanding only one mechanism will be described.

Guide/support channels 50*a,b* are attached to the carrier 10 base by means of bottom support channels 14*a,b* and bottom cross channels 51*a,b* respectively. A cross-plate 52 is attached between the channels 50*a,b* at some elevation from the channels 14*a,b* and 51*a,b* for adding rigidity to channels 50*a,b*.

A two-way hydraulic cylinder 54 is mounted on cross-plate 52 by means of mounting bracket 56. Hydraulic cylinder 54 has a piston 58 to which is attached a tee member 60. The tee 60 consists of two plates 61*a,b* between which are mounted two sprockets 62*a,b*.

Lifting chains 64*a,b* are attached to cylinder bracket 56 on either side of cylinder 54. They are looped around the sprockets 62*a,b* and attached to sliding channels 66*a,b* respectively. Rollers 68*a,b* are attached to channel 66*a*, and rollers 68*c,d* are attached to channel 66*b*. The rollers 68*a–d* are disposed for engaging with channels 50*a,b* respectively. Thus it can be seen that as piston 58 is extended or retracted the sliding channels 66*a,b* will move in either an upward or downward direction.

Attached to channels 66*a,b* is a lifting beam 70 which spans almost the entire length of the carrier 10. Lifting tines 72*a,b* hang from either end of beam 70 for engaging the load. Detents, such as 73, are located along the upper edge of beam 70 so that the lifting tines 72*a,b*, which have matching internal teeth, may be adjusted to the proper length for a given load.

The cylinder 54 is actuated by hydraulic pump 108 mounted on the base plate 19*b* as shown in FIGS. 1, 2 and 3. Lifting is accomplished by pumping hydraulic fluid into the bottom of cylinder 54 which causes piston 58 to extend. Likewise, lowering is accomplished by pumping hydraulic fluid into the top of cylinder 54 which causes piston 58 to retract.

The carrier 10 is maneuvered and driven by means of steering and traction units 74*a,b* located on either side of the carrier 10. In the embodiment shown in FIG. 5 unit 74*b* consists of a motor control unit 76*b*, an electric motor 78*b*, a transmission 80*b*, and a drive wheel 82*b*. Unit 74*a* is identically equipped.

In order to maneuver in certain directions the drive wheels 82*a,b* must be turned. This is accomplished by means of servomotors 83*a,b*. In the embodiment shown in FIG. 5 servomotor 83*b*, which is identical to 83*a*, includes an electric motor 84*b* which drives a gear reducer 86*b*. A sprocket gear 88*b* is mounted in the reducer 86*b*. Chain 94*b* is looped between sprocket 88*b* and a second sprocket 92*b* mounted about drive wheel housing 90*b*. Thus, any rotation of sprockets 88*a,b* will result in rotation of the drive wheels 82*a,b*.

Caster wheels 114*a–d* are mounted at the corners of the carrier frame. These wheels provide additional mobile support and balance making the carrier 10 easy to maneuver about.

Power for the electric pump and motors may be supplied from two 36 volt batteries 106*a,b*. However, other voltages could be used depending on motor availability and load requirements. A control panel 100 is mounted on one side of the carrier frame 12. Panel 100 contains devices for monitoring various functions, such as battery level, and switches for operating various devices, such as the hydraulic lift system. The control circuits for the steering and drive systems are mounted inside panel 100.

Figure 7:
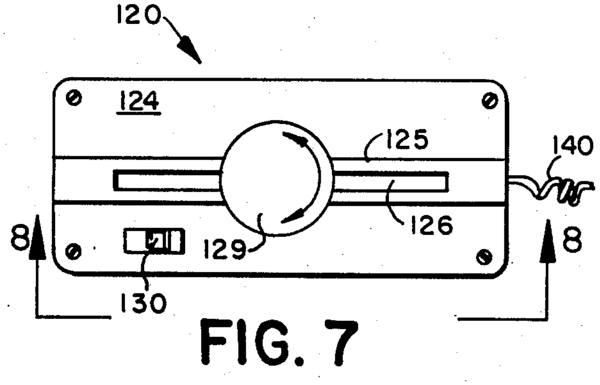
FIG. 7 shows a plane view of a control unit according to the invention.
Figure 8:
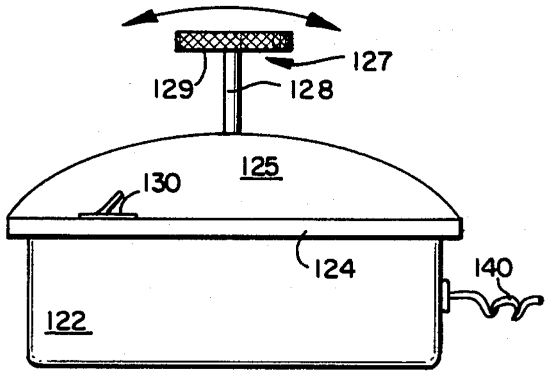
FIG. 8 shows a side of the control unit as viewed along line 8—8 of FIG. 7.

The carrier 10 is operated by means of a remote control unit 120. The control unit 120 is shown in greater detail in FIGS. 7 and 8. The unit 120 has a body 122 in which are housed the electrical and electronic components for controlling the carrier 10. These components would consist of potentiometers and other devices connected to generate control signals for operating the carrier 10.

A cover 124 having an arched ridge 125 is fastened over the body 122. Ridge 125 has an elongated slot 126 through which the control handle 127 protrudes. Handle 127 may be moved forward and back along the slot to initiate forward or reverse motion of the carrier 10. Handle 127 consists of a stem 128 to which is attached a head 129. In addition to moving along the slot 126 the handle 127 rotates about its Z-axis. Rotation of handle 127 controls steering of the carrier 10.

A mode switch 130 is mounted on cover 127. Switch 130 is a two-position toggle switch for selecting between the two modes of operation of the carrier 10. These modes of operation will be described shortly. The overall size of control unit 120 would be small enough to be handheld by an operator. The control unit 120 may be hardwired to the control panel 100 by means of an umbilical cable 140. Alternatively, the unit 120 may be equipped with a small radio transmitter and the control panel equipped with a comparable receiver for radio control.

Operating functions of the straddle-lift carrier 10 according to the subject invention are illustrated in FIGS. 9A–F and 10A–D. As indicated above there are two modes of operation for the carrier 10: a NORMAL mode and a LATERAL/OBLIQUE mode. FIGS. 9A–F illustrate operation of the carrier 10 in the NORMAL mode. In this mode the drive wheels 82*a,b* are maintained in a straight fore and aft orientation. The mode switch 130 is in the NORMAL position.

Figure 9A:
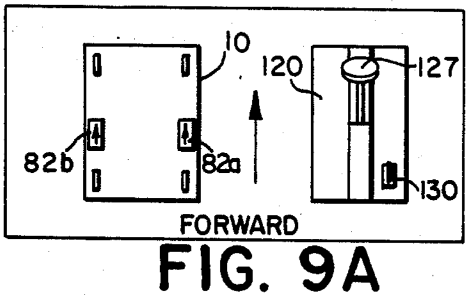
FIGS. 9A to 9F show various operations of the carrier when operated in one of the two modes of operation.
Figure 9B:
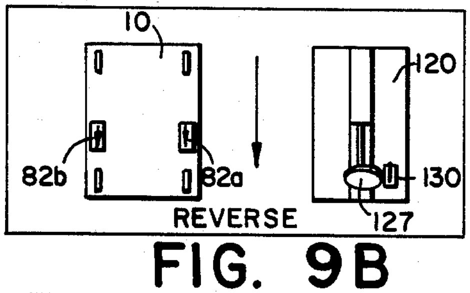

As shown in FIG. 9A when the handle 127 of control unit 120 is pushed forward the drive wheels 82*a,b* will operate to drive the carrier 10 forward. By moving handle 127 backward the carrier 10 will travel in reverse as shown in FIG. 9B.

Figure 9C:
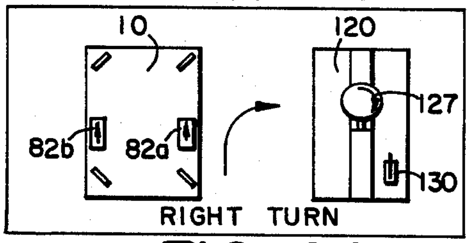
Figure 9D:
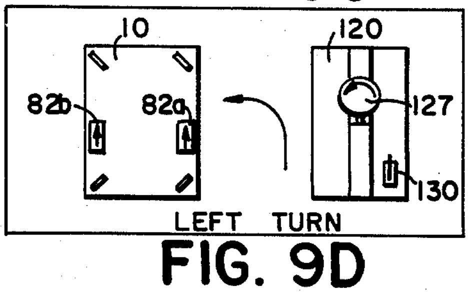

Turning capability is illustrated in FIGS. 9C,D. Carrier 10 may be turned to the right by pushing handle 127 forward and rotating it clockwise. This will cause drive wheel 82*b* to operate at a higher speed than wheel 82*a* with the result that carrier 10 will move forward and to the right as shown in FIG. 9C. Counterclockwise rotation of handle 127 would result in a left turn as shown in FIG. 9D. The turning degree is determined by the amount of rotation of the handle 127. A small degree of rotation will result in a wide turn, whereas a larger degree of rotation will result in a sharper turn.

Figure 9E:
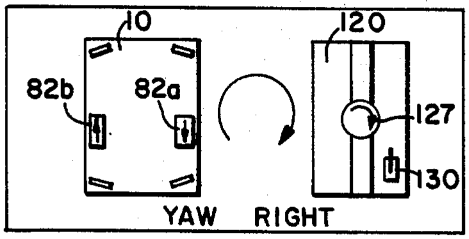
Figure 9F:
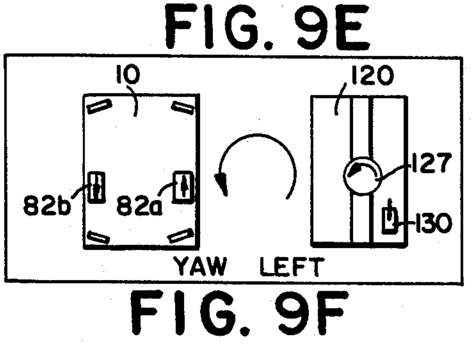

Carrier 10 can also be made to rotate about its own axis. As shown in FIGS. 9E and 9F, with handle 127 in a central or neutral position (i.e. no forward or reverse motion) rotation of the handle 127 will cause the drive wheels 82*a,b* to operate in opposite directions. Clockwise rotation will cause carrier 10 to yaw to the right, whereas counterclockwise rotation causes yaw to the left.

Figure 10A:
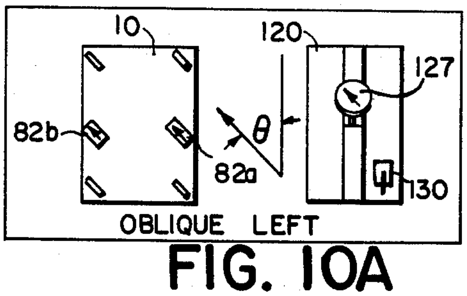
FIGS. 10A to 10D show various operations of the carrier when operated in the second mode of operation.
Figure 10B:
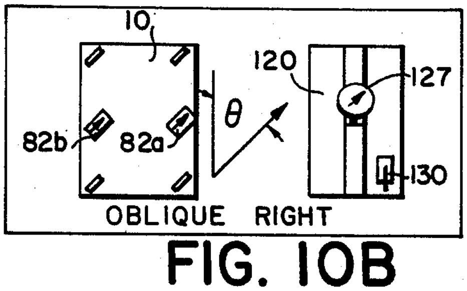
Figure 10C:
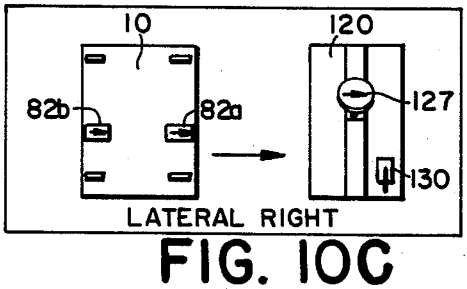
Figure 10D:
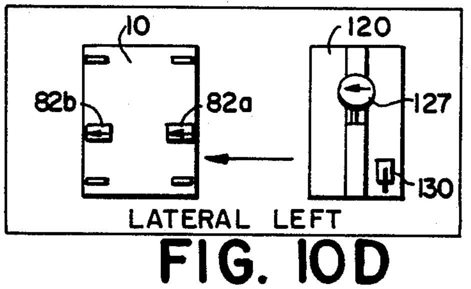

When the mode switch 13 is in the LATERAL/OBLIQUE mode position, the drive wheels 82*a,b* can be rotated for operation as shown in FIGS. 10A–D. In FIG. 10A control handle 127 is rotated a certain amount counterclockwise while in the neutral position. This will cause the drive wheels 82*a,b* to be turned to the left by an angle, $\theta$. When the wheels 82*a,b* reach the desired angle, handle 127 can be pushed forward or back and carrier 10 will move at an oblique angle $\theta$ from straight forward or reverse. FIG. 10B shows similar operation but to the right. If the handle 127 is rotated 90° clockwise or counterclockwise then the carrier 10 can be driven laterally either to the right or to the left as shown in FIGS. 10C and 10D.

Some of the many advantages and new features of the subject invention should now be apparent in view of the foregoing description. For example, a straddle-lift carrier has been described which is capable of engaging and lifting elongated loads. The carrier is equipped with apparatus for adjusting its width in order to accommodate different size loads. This width adjustment feature also allows the carrier to be made compact for storage in minimal space.

The carrier according to the subject invention has steering and traction equipment which is controlled by a single, remote unit. The configuration of the steering and traction equipment provides numerous operations giving the carrier a high degree of maneuverability.

Numerous additional modifications and variations of the subject invention are possible in light of the above teachings. For example, a hydraulic system could be used in place of the threaded shafts for adjusting the frame width. Internal combustion engines or hydraulic motors could be used as prime movers in lieu of electric motors. Also, fluidic controls could be substituted for the electrical controls. Alternate drive wheel configurations could also be employed. Additionally, the carrier frame could be equipped to adjust its height in order to accommodate tall loads and to permit stacking. It is therefore to be understood that within the scope of the appended claims, the invention may be practiced otherwise than as specifically described herein.

What is claimed is:

1. A multi-directional straddle-lift carrier comprising:

(A) a frame having a generally inverted U-shaped cross-section and formed for straddling a load;

(B) adjustment means disposed between the sides of said frame for adjusting the space between the sides of said frame, said adjustment means comprising:

(1) telescoping means connected between the sides of the frame for moving the sides of the frame toward or away from each other, said telescoping means comprising:

(a) a first pair of channeled members parallely spaced and extending horizontally from the top of one side of the frame, (b) a second pair of channeled members parallely spaced and extending horizontally from the top of the other side of the frame, said second pair of channeled members sharing a common plane with and spaced such that they fit between said first pair of channeled members, (c) a first cross-member fastened between the free ends of said first pair of channeled members, (d) a second cross-member fastened between the free ends of said second pairs of channeled members, and (e) a plurality of guide-rollers fastened to said second pair of channeled members for engaging with said first pair of channeled members such that said first and second pairs of channeled members may slide relative to each other, and (2) actuator means for adjusting the length of said telescoping means whereby the width of the frame may be adjusted, said actuator means comprising:

(a) first threaded bearing means affixed to the first cross-member between the first pair of channeled members, (b) first bearing means affixed to the top of one side of the frame between the second pair of channeled members for supporting a first threaded shaft formed to be rotated therein and having an unthreaded section at one end, said first threaded shaft being threaded through said first threaded bearing means and having its unthreaded end supported by said first bearing means, (c) stop means for prohibiting longitudinal movement of said first threaded shaft relative to said first bearing means, and (d) means for rotating said first threaded shaft whereby the width of the carrier frame may be adjusted;

(C) means for moving the first and second pairs of channel members relative to each other and comprising:

(1) second threaded bearing means affixed to the second cross-member between the second pair of channeled members, (2) second bearing means affixed to the top of the other side of the carrier frame between the first pair of channeled members for supporting a second threaded shaft formed to be rotated therein and having an unthreaded section at one end, said second threaded shaft being threaded through said second threaded bearing means and having its unthreaded end supported by said second bearing means, (3) stop means for prohibiting longitudinal movement of said second threaded shaft relative to said second bearing means, and (4) means for rotating said second threaded shaft with said first threaded shaft whereby the width of the carrier frame may be adjusted;

(D) steering and traction means mounted on the frame for moving and turning said straddle-lift carrier, said steering and traction means comprising:

(1) two steering and traction units, each unit comprising:

(a) a traction wheel rotatably mounted on the carrier frame, (b) first propulsion means for applying traction to said traction wheel and comprising:

(i) a first electric motor, and (ii) first transmission means for transmitting torque from said electric motor to the traction wheel, and (c) second propulsion means for rotating said traction wheel about its vertical axis, whereby the straddle-lift carrier may be driven and steered in a desired direction, said second propulsion means comprising:

(i) a second electric motor, and (ii) second transmission means for translating rotation of said second electric motor into rotation of traction wheel about its vertical axis, whereby the direction of travel of the straddle-lift carrier may be varied;

(E) control means for controlling said steering and traction means whereby said straddle-lift carrier may be moved in a desired lateral direction, said control means comprising:

(1) a remote control unit comprising:

(a) housing means for containing the control unit circuit components, (b) a cover for enclosing said housing means, said cover having an arched ridge and a longitudinal slot along the top of said arched ridge, (c) a control handle protruding through said longitudinal slot, said control handle being adapted for motion along said longitudinal slot for generating forward and reverse drive control signals, said control handle also being adapted for rotation about its own axis for generating steering and turning control signals, (d) a mode selection switch, and (e) means for transmitting electrical control signals to the straddle-lift carrier, whereby said carrier may be remotely operated; and (F) lifting means disposed on either side of the frame for engaging and elevating a load when the load has been straddled by said carrier, said lifting means comprising:

(1) a pair of hydraulically actuated unit disposed interior to and on either side of the carrier, each unit comprising:

(a) a first pair of vertical members parallely disposed on the side of the carrier, (b) a hydraulic cylinder rigidly mounted to said vertical members, said hydraulic cylinder being disposed to operate in a vertical direction, and (c) forklift means for engaging and supporting a load, said forklift means operatively connected to said hydraulic cylinder such that operation of said hydraulic cylinder will be translated into raising and lowering of said forklift means which further comprises:

(i) a horizontal beam, (ii) two lifting tines adjustably disposed at either end of said horizontal beam for engaging the load, (iii) a second pair of vertical members fixedly attached to said horizontal beam and disposed for slidably engaging with the first pair of vertical members, and (iv) tension means operatively connected between said second pair of vertical members and the hydraulic cylinder such that vertical motion of the hydraulic cylinder will cause vertical motion of said second pair of vertical member whereby the forklift means may be raised and lowered.

2. A straddle-lift carrier as recited in claim 1 wherein the second pair of vertical members further comprise a plurality of rollers for engaging with the first pair of vertical members.

3. A straddle-lift carrier as recited in claim 2 wherein the tension means further comprises:

a horizontal member fixedly attached to the hydraulic cylinder;

sprocket means disposed at either end of said horizontal member; and a pair of chains each fixedly attached at one end, looped around said sprocket means, and attached to each of the second pair of vertical members.

* * * * *